(12) United States Patent
Je et al.

(10) Patent No.: US 12,510,581 B2
(45) Date of Patent: Dec. 30, 2025

(54) ELECTRIC CURRENT SENSOR, STEERING CONTROL DEVICE, AND METHOD FOR DETECTING ELECTRIC CURRENT

(71) Applicant: HL MANDO CORPORATION, Pyeongtaek (KR)

(72) Inventors: Kyu Yeong Je, Yongin (KR); Su Min Lee, Siheung (KR)

(73) Assignee: HL MANDO CORPORATION, Pyeongtaek (KR)

( * ) Notice: Subject to any disclaimer, the term of this patent is extended or adjusted under 35 U.S.C. 154(b) by 264 days.

(21) Appl. No.: 17/789,203

(22) PCT Filed: Apr. 6, 2021

(86) PCT No.: PCT/KR2021/004260
§ 371 (c)(1),
(2) Date: Jan. 6, 2023

(87) PCT Pub. No.: WO2021/210836
PCT Pub. Date: Oct. 21, 2021

(65) Prior Publication Data
US 2024/0230741 A1    Jul. 11, 2024

(30) Foreign Application Priority Data
Apr. 14, 2020 (KR) ........................ 10-2020-0045568

(51) Int. Cl.
*G01R 31/00* (2006.01)
*B62D 5/04* (2006.01)
(Continued)

(52) U.S. Cl.
CPC ........... *G01R 31/006* (2013.01); *B62D 5/049* (2013.01); *G01R 15/202* (2013.01); *G01R 35/005* (2013.01); *G01R 15/146* (2013.01)

(58) Field of Classification Search
CPC .. G01R 31/006; G01R 15/202; G01R 35/005; G01R 15/146; G01R 19/0092;
(Continued)

(56) References Cited

U.S. PATENT DOCUMENTS

2002/0153871 A1* 10/2002 Barcelo ................. H02M 3/158
323/316
2006/0232262 A1* 10/2006 Tanizawa ............. G01R 15/183
324/117 H
(Continued)

FOREIGN PATENT DOCUMENTS

JP          2002220062 A    8/2002
KR    10-2012-0093444 A    8/2012
(Continued)

OTHER PUBLICATIONS

Office Action issued in Korean Patent Application No. 10-2020-0045568 dated Oct. 31, 2024.

*Primary Examiner* — Feba Pothen
(74) *Attorney, Agent, or Firm* — Harvest IP Law, LLP

(57) ABSTRACT

The present embodiments relate to an electric current sensor, a steering control device, and a method for detecting an electric current. An electric current sensor may comprise: a conductive part through which an electric current flows; a detection unit for detecting a magnetic field generated by the electric current flowing through the conductive part; a first generation unit for generating a first electric current sensing value on the basis of the resistance included in the conductive part; and a second generation unit for generating a second electric current sensing value on the basis of the magnetic field detected through the detection unit.

8 Claims, 13 Drawing Sheets

(51) Int. Cl.
*G01R 15/14* (2006.01)
*G01R 15/20* (2006.01)
*G01R 35/00* (2006.01)

(58) Field of Classification Search
CPC ...... G01R 31/007; G01R 15/20; G01R 35/00; B62D 5/049; B62D 5/0481; B62D 5/046; B62D 5/0484
See application file for complete search history.

(56) References Cited

U.S. PATENT DOCUMENTS

| | | |
|---|---|---|
| 2014/0035563 A1* | 2/2014 | Tan .................. G05B 15/02 |
| | | 324/207.2 |
| 2017/0261536 A1* | 9/2017 | Chae .................. G01R 15/146 |
| 2019/0039641 A1 | 2/2019 | Toda |
| 2019/0241207 A1* | 8/2019 | Jeong .................. B62D 15/021 |

FOREIGN PATENT DOCUMENTS

| | | | |
|---|---|---|---|
| KR | 10-2015-0124358 A | | 11/2015 |
| KR | 20160035969 A | | 4/2016 |
| KR | 20190029005 | * | 3/2019 |
| KR | 20190029005 A | | 3/2019 |
| KR | 20190050614 A | | 5/2019 |

* cited by examiner

ELECTRIC CURRENT SENSOR, STEERING CONTROL DEVICE, AND METHOD FOR DETECTING ELECTRIC CURRENT

TECHNICAL FIELD

The present embodiments relates to a current sensor, a steering control device, and a current detection method.

BACKGROUND ART

In general, steering system refers to a system in which the driver of a vehicle may change the steering angle of the wheels of a vehicle based on the steering force (or rotational force) applied to the steering wheel. Electromotive power steering systems, e.g., electric power steer (EPS), have been recently applied to vehicles to ensure stable steering by reducing the steering force of the steering wheel.

There is an increasing requirement for reliability and redundancy functionality in recent vehicle steering systems.

DETAILED DESCRIPTION OF THE INVENTION

Technical Problem

The present embodiments may provide a current sensor capable of enhancing the redundancy and reliability.

Further, the present embodiments may provide a steering control device capable of the redundancy and enhancing reliability.

Further, the present embodiments may provide a current detection method capable of enhancing the redundancy and reliability.

Technical Solution

In an aspect, the present embodiments may provide a current sensor comprising a conductor unit through which current flows; a detector detecting a magnetic field generated by the current flowing through the conductor unit; a first generator generating a first current sensing value based on a resistor included in the conductor unit; and a second generator generating a second current sensing value based on the magnetic field detected through the detector.

In another aspect, the present embodiments may provide a steering control device, comprising a steering motor power source unit converting electric energy based on a steering motor control signal to generate an assist current and controlling a steering motor based on the assist current; and at least one current sensor detecting the assist current flowing between the steering motor power source unit and the steering motor, wherein the current sensor includes a conductor unit through which the assist current flows; a detector detecting a magnetic field generated by the assist current flowing through the conductor unit; a first generator generating a first current sensing value based on a resistor included in the conductor unit; and a second generator generating a second current sensing value based on the magnetic field detected through the detector.

In another aspect, the present embodiments may provide a current detection method comprising flowing current through a conductor unit; detecting a magnetic field generated by the current flowing through the conductor unit; generating a first current sensing value based on a resistor included in the conductor unit; and generating a second current sensing value based on the detected magnetic field.

Advantageous Effects

According to the present embodiments, there may be provided a current sensor capable of enhancing the redundancy and reliability.

According to the present embodiments, there may be provided a steering control device capable of enhancing the redundancy and reliability.

According to the present embodiments, there may be provided a current detection method capable of enhancing the redundancy and reliability.

MODE FOR CARRYING OUT THE INVENTION

Figure 1:
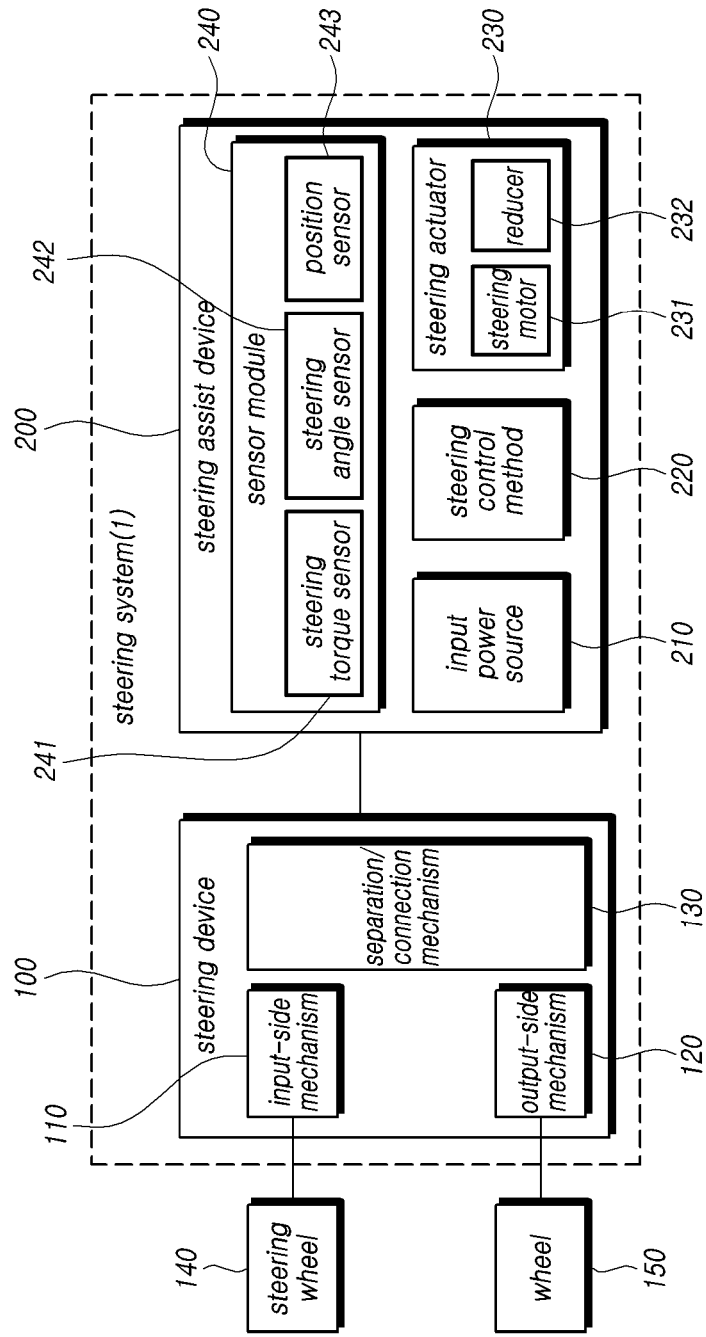
FIG. 1 is a block diagram illustrating a configuration of a steering system according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a configuration of a steering system according to the present embodiments.

Referring to FIG. 1, according to an embodiment, a steering system 1 may include at least one of a steering device 100 or a steering assist device 200. The steering device 100 and the steering assist device 200 may be connected by at least one of an electrical, magnetic, or mechanical connection.

There may be provided one or more steering devices 100. The steering device 100 may change the steering angle of a wheel 150 based on a steering force (or rotational force) applied to the steering wheel 140. The steering device 100 may include at least one of an input-side mechanism 110, an output-side mechanism 120, or a separation/connection mechanism 130. The input-side device 110, the output-side device 120, and the separation/connection device 130 may be connected by at least one of an electrical, magnetic, or mechanical connection.

There may be provided one or more input-side mechanisms 110. The input-side mechanism 110 may be connected to the steering wheel 140. The input-side mechanism 110 may rotate in a rotational direction of the steering wheel 140 or in a direction opposite to the rotational direction of the steering wheel 140. The input-side mechanism 110 may include a steering shaft connected to the steering wheel 140 but, without limitations thereto, may include any mechanism (or device) that may rotate in the rotational direction of the steering wheel or in the direction opposite to the rotational direction of the steering wheel.

There may be provided one or more output-side mechanisms 120. The output-side device 120 may be connected to the input-side device 110 by at least one of an electrical or mechanical connection. The output-side mechanism 120 may be connected to the wheel 150, changing the steering angle (or movement) of the wheel 150. The output-side mechanism 120 may include at least one of a pinion, a rack, a tie rod, or a knuckle arm but, without limitations thereto, may include any mechanism (or device) that may change the steering angle (or movement) of the wheel.

There may be provided one or more separation/connection mechanisms 130. The separation/connection mechanism 130 may be connected to the input-side mechanism 110 and the output-side mechanism 120. The separation/connection mechanism 130 may mechanically and/or electrically connect and/or separate the input-side mechanism 110 and the output-side mechanism 120. The separation/connection mechanism 130 may include a clutch but, without limitations thereto, may include any mechanism (or device) that may connect and/or separate the input-side mechanism and the output-side mechanism.

According to an embodiment, the steering device 100 may include at least one of a steering device in which an input-side mechanism and an output-side mechanism are connected mechanically, a steering device (e.g., steer by wire (SbW)) in which an input-side mechanism and an output-side mechanism are connected electrically, or a steering device (e.g., an SbW including a clutch) in which an input-side mechanism and an output-side mechanism are connected with a separation/connection mechanism.

There may be provided one or more steering wheels 140 or one or more wheels 150. The steering wheel 140 and the wheel 150 may be separately provided as illustrated in the drawings but, without limitations thereto, may be included in the steering device 100.

There may be provided one or more steering assist devices 200. The steering assist device 200 may be connected with the steering device 100. The steering assist device 200 may provide an assist steering force to the steering device 100.

According to an embodiment, the steering assist device 200 may include at least one of an input power source 210, a steering control module 220, a steering actuator 230, or a sensor module 240. The input power source 210, the steering control module 220, the steering actuator 230, and the sensor module 240 may be connected by at least one of an electrical, magnetic, or mechanical connection.

There may be provided one or more input power sources 210. The input power source 210 may include at least one of a direct current (DC) power source or an alternating current (AC) power source. In particular, the DC power source may include a battery but, without limitations thereto, may include any power source may provide DC power.

The sensor module 240 may include at least one sensor. Here, the sensor may include at least one of a steering torque sensor 241, a steering angle sensor 242, or a position sensor 243 but, without limitations thereto, may include any sensor capable of measuring the state of the vehicle and the steering state of the vehicle.

There may be provided one or more steering torque sensors 241. The steering torque sensor 241 may measure the steering torque of the steering wheel to obtain torque information about the steering wheel, and provide the torque information about the steering wheel to the steering control module 220. There may be provided one or more steering angle sensors 242. The steering angle sensor 242 may measure the steering angle of the steering wheel to obtain steering angle information about the steering wheel, and provide the steering angle information about the steering wheel to the steering control module 220. There may be provided one or more position sensors 243. The position sensor 243 may measure at least one of the position of the input-side mechanism, the position of the output-side mechanism, or the position of the steering motor to thereby obtain at least one of position information about the input-side mechanism, position information about the output-side mechanism, or position information about the steering motor and may provide at least one of the position information about the input-side mechanism, the position information about the output-side mechanism, or the position information about the steering motor to the steering control module 220.

The steering torque sensor 241, the steering angle sensor 242, and the position sensor 243 may be included in the sensor module as illustrated in the drawings but, without limitations thereto, may be included in at least one of the input-side mechanism 110, the output-side mechanism 120, the separation/connection mechanism 130, the steering wheel 140, the wheel 150, the input power source 210, the steering control module 220, or the steering actuator 230 (steering motor 231 or decelerator 232).

There may be provided one or more steering control modules 220. The steering control module 220 may be connected to the input power source 210. The steering control module 220 may receive electrical energy from the input power source 210 and filter noise of the electrical energy.

The steering control module 220 may generate a steering motor control signal based on information (e.g., at least one of the steering torque information, steering angle information, position information, or vehicle speed information) received from each component in the steering system 1 and/or the vehicle.

The steering control module 220 may convert the filtered electric energy according to the steering motor control signal to thereby generate an assist steering force and control the steering actuator 230 (or steering motor 231) based on the assist steering force.

There may be provided one or more steering actuators 230. The steering actuator 230 may be connected with the steering control module 220. The steering actuator 230 may operate based on the assist steering force provided from the steering control module 220, assisting the steering device 100 in steering.

The steering actuator 230 may include at least one of the steering motor 231 or a decelerator 232. There may be provided one or more steering motors 231 or one or more decelerators 232. At least one of the steering motor 231 or the decelerator 232 may be connected with the steering control module 220.

If the steering actuator 230 includes the steering motor 231, the steering motor 231 may operate based on the assist steering force provided from the steering control module 220, assisting the steering device 100 in steering.

If the steering actuator 230 includes the steering motor 231 and the decelerator 232, the steering motor 231 may operate based on the assist steering force provided from the steering control module 220, and the decelerator 232 may operate according to the operation of the steering motor 231 to thereby assisting the steering device 100 in steering.

The steering motor 231 may include at least one of a single winding-type steering motor or a winding-type steering motor but, without limitations thereto, may include any motor that may assist the steering device in steering.

The steering motor 231 may include at least one of a single-phase type motor, a three-phase type motor, or a five-phase type motor but, without limitations thereto, may include any motor that may assist the steering device in steering.

The steering motor 231 may include at least one of a DC motor or an AC motor (e.g., a synchronous motor and/or an induction motor) but, without limitations thereto, may include any motor that may assist the steering device in steering.

Figure 2:
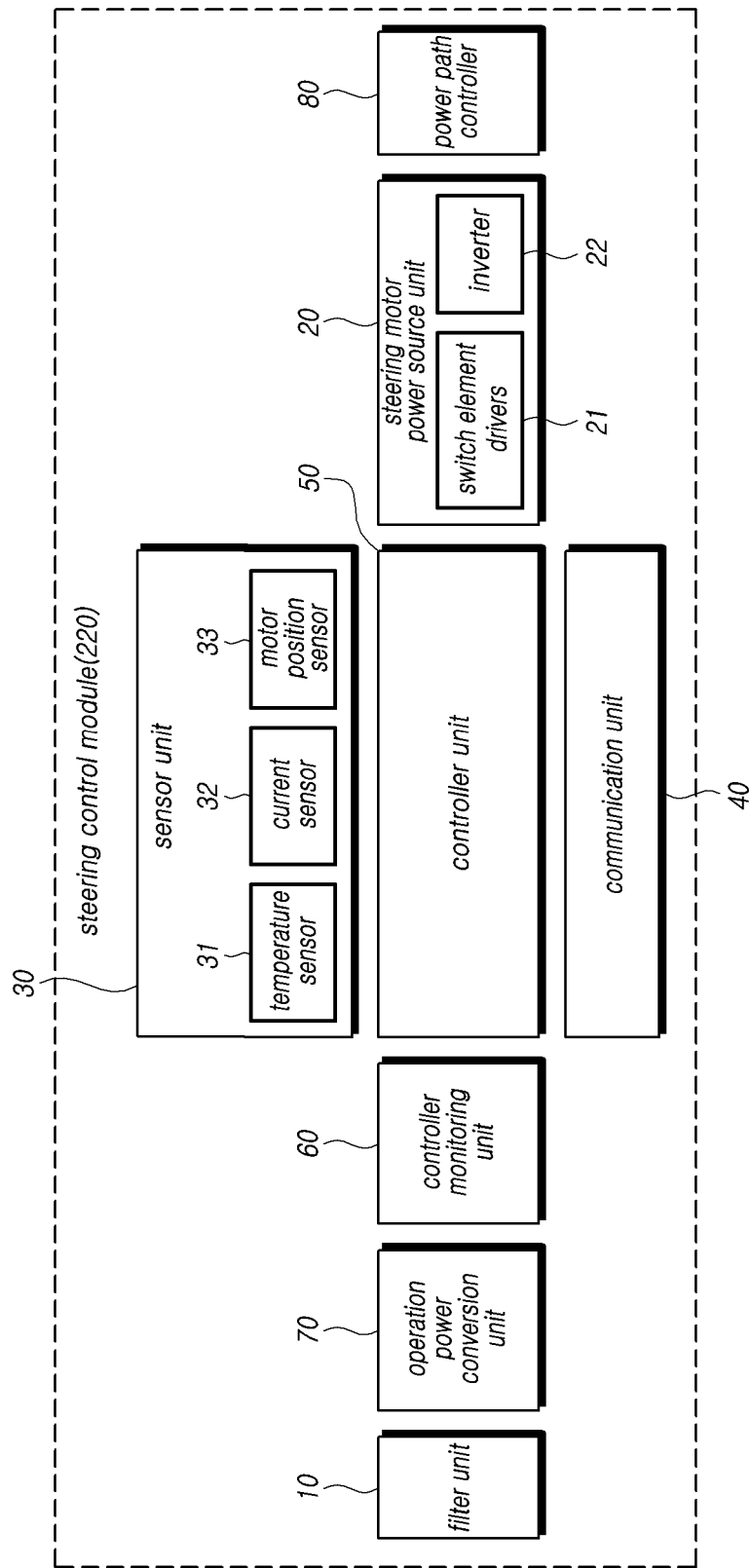
FIG. 2 is a block diagram illustrating a configuration of a steering control module according to the present embodiments.

FIG. 2 is a block diagram illustrating a configuration of a steering control module according to the present embodiments.

Referring to FIG. 2, according to an embodiment, the steering control module 220 may include at least one of a filter unit 10, a steering motor power source unit 20, a sensor unit 30, a communication unit 40, a controller unit 50, a controller monitoring unit 60, an operation power conversion unit 70, or a power path controller 80. The filter unit 10, the steering motor power source unit 20, the sensor unit 30, the communication unit 40, the controller unit 50, the controller monitoring unit 60, the operation power conversion unit 70, and the power path controller 80 may be connected by at least one of an electrical, magnetic, or mechanical connection.

There may be provided one or more filter units 10. The filter unit 10 may be connected to the input power source. The filter unit 10 may filter noise of electric energy provided from the input power source and provide the filtered electric energy to the steering motor power source unit 20 and the operation power conversion unit 70.

There may be provided one or more steering motor power source units 20. The steering motor power source unit 20 may be connected with the filter unit 10 and may receive filtered electric energy from the filter unit 10. The steering motor power source unit 20 may be connected with the controller unit 50 and may receive a steering motor control signal from the controller unit 50. The steering motor power source unit 20 may generate an assist steering force by converting the filtered electric energy based on the steering motor control signal, and control the steering motor based on the assist steering force.

The steering motor power source unit 20 may include at least one of a switch element driver 21 or an inverter 22. There may be provided one or more switch element drivers 21 or one or more inverters 22. The switch element driver 21 and the inverter 22 may be connected by at least one of an electrical, magnetic, or mechanical connection.

The switch element driver 21 may receive the steering motor control signal from the controller unit 50, generate a switch element control signal based on the steering motor control signal, and provide the switch element control signal to the inverter 22. The inverter 22 may convert the filtered electrical energy of the filter unit according to the switch element control signal, generating an assist steering force.

The inverter 22 may include a switch and/or a transistor but, without limitations thereto, may include any element (or device) that may generate an assist steering force by converting the electrical energy according to the steering motor control signal and/or the switch element control signal.

If the inverter 22 includes a field effect transistor (FET), the switch element driver 21 may be a gate driver. Accordingly, the gate driver may receive the steering motor control signal from the controller unit 50, generate a gate control signal based on the steering motor control signal, and provide the gate control signal to the inverter 22. The inverter 22 may convert the filtered electric energy of the filter unit according to the gate control signal, generating an assist steering force.

There may be provided one or more power path controllers 80. The power path controller 80 may be located between the steering motor power source unit 20 (or the inverter 22) and the steering actuator 230 (or the steering motor 231), supplying or cutting off the supply of the assist steering force received from the steering motor power source unit 20 (or the inverter) to the steering actuator 230 (or the steering motor 231).

The power path controller 80 may include at least one phase disconnector (PCO). The phase disconnector is an element or circuit capable of cutting off a phase, and may include at least one of a switch, a circuit breaker, a disconnecting switch, or a transistor but, without limitations thereto, may include any element or circuit that may cut off a phase.

The sensor unit 30 may include at least one of a temperature sensor 31, a current sensor 32, or a motor position sensor 33 but, without limitations thereto, may include any sensor that may measure the state of the steering system (or the steering control module). There may be provided one or more temperature sensors 31, one or more current sensors 32, or one or more motor position sensors 33.

The temperature sensor 31 may measure the temperature of the steering control module 220 to thereby obtain temperature information, and provide the temperature information to the controller unit 50. The current sensor 32 may measure the assist current (or assist steering force) provided from the steering motor power source unit 20 to the steering actuator 230 (or the steering motor 231) to thereby obtain assist current information, and provide the assist current information to the controller unit 50. The motor position sensor 33 may measure the position of the steering motor to thereby obtain position information motor, and may provide the position about the steering information about the steering motor to the controller unit 50. The motor position sensor 33 may be included in the steering control module 220 but, without limitations thereto, may be provided separately.

There may be provided one or more communication units 40. The communication unit 40 may include at least one of an internal communication unit or an external communication unit. When there are a plurality of steering control modules, the internal communication unit may be connected with other steering control modules to receive or provide information. The external communication unit may be connected with the vehicle to receive vehicle state information (e.g., vehicle speed information) from the vehicle or provide information related to the steering system to the vehicle.

There may be provided one or more controller units 50. The controller unit 50 may be connected with each component of the steering control module 220 to provide or receive information and, based thereupon, control the operation for each component of the steering control module 220.

For example, the controller unit 50 may generate a steering motor control signal based on at least one of the torque information about the steering wheel, steering angle information about the steering wheel, temperature information, assist current information, position information (position information about the input-side mechanism, position information about the output-side mechanism, and position information about the steering motor), vehicle state information (e.g., vehicle speed information), state information about the input power source, short circuit (or overcurrent) state information, current sensing information about the filter unit, or state information about the steering motor, and provide the steering motor control signal to the steering motor power source unit 20 (or switch element driver 21), or may generate a separation/connection control signal (e.g., a clutch control signal) and provide the separation/connection control signal to the separation/connection mechanism.

The controller unit 50 may include a microcontroller but, without limitations thereto, may include any device (or computer) that may process (or execute or compute) programs.

The controller monitoring unit 60 may be connected with the controller unit 50. The controller monitoring unit 60 may monitor the operating state of the controller unit 50. For example, the controller unit 50 may provide a watchdog signal to the controller monitoring unit 60. The controller monitoring unit 60 may be cleared based on the watchdog signal received from the controller unit 50 or may generate a reset signal and provide the reset signal to the controller unit 50.

The controller monitoring unit 60 may include a watchdog but, without limitations thereto, may include any device capable of monitoring the controller unit. In particular, a watchdog may include a window watchdog having a deadline, that is, a start and an end.

The operation power conversion unit 70 may be connected with the filter unit 10. The operation power conversion unit 70 may generate an operating voltage for each component of the steering control module 220 by converting the filtered electrical energy received from the filter unit 10. The operation power conversion unit 70 may include at least one of a DC-DC converter or a regulator but, without limitations thereto, may include any device that may convert the filtered electrical energy to thereby generate an operating voltage for each component of the steering control module and/or for the outside of the steering control module.

The steering control module 220 may include an electronic control unit (ECU) but, without limitations thereto, may include any controller (or system) that may perform electronic control.

Figure 3:
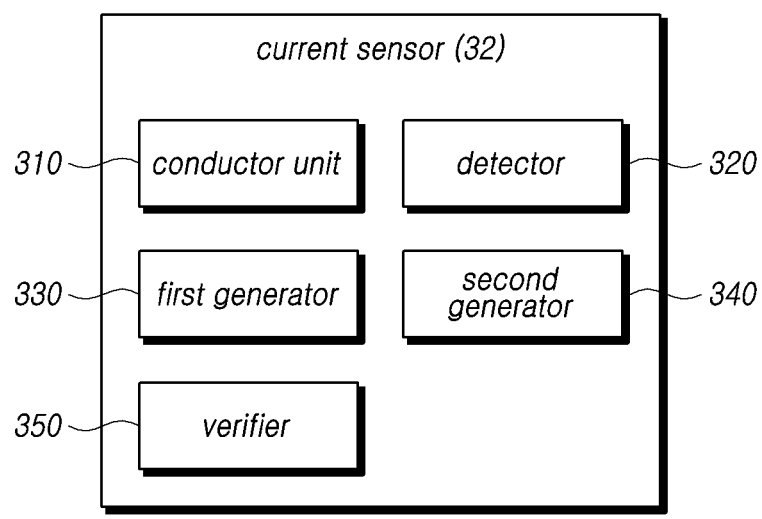
FIG. 3 is a block diagram illustrating a configuration of a current sensor according to the present embodiments.

FIG. 3 is a block diagram illustrating a configuration of a current sensor according to the present embodiments.

Referring to FIG. 3, a current sensor 32 according to the present embodiments may include at least one of a conductor unit 310, a detector 320, a first generator 330, a second generator 340, and a verifier 350. The conductor unit 310, the detector 320, the first generator 330, the second generator 340, and the verifier 350 may be connected by at least one of an electrical, magnetic, or mechanical connection.

The current sensor 32 according to the present embodiments may include a conductor unit 310 through which current flows; a detector 320 detecting a magnetic field generated by the current flowing through the conductor unit 310; a first generator 330 generating a first current sensing value based on a resistor included in the conductor unit 310; and a second generator 340 generating a second current sensing value based on the magnetic field detected through the detector 320.

There may be provided one or more conductor unit 310. A current may flow through the conductor unit 310. The conductor unit 310 may generate a magnetic field based on the flowing current. The conductor unit 310 may be referred to as a conductor, a conducting body, or an electric conductor.

There may be provided one or more detectors 320. The detector 320 may detect the magnetic field generated by the current flowing through the conductor unit 310. The detector 320 may detect the voltage based on the detected magnetic field.

Here, the current flowing through the conductor unit 310, the magnetic field detected through the detector 320, and the voltage detected through the detector 320 may have a proportional relationship with each other.

There may be provided one or more first generator 330. The first generator 330 may generate a first current sensing value based on the resistance included in the conductor unit 310. In other words, the first generator 330 may generate the first current sensing value corresponding to (or proportional to) the current flowing through the conductor unit 310 based on the resistance included in the conductor unit 310.

There may be provided one or more second generator 340. The second generator 340 may generate a second current sensing value based on the magnetic field detected through the detector 320. In other words, the second generator 340 may generate the second current sensing value corresponding to (or proportional to) the current flowing through the conductor unit 310 based on the magnetic field detected through the detector 320.

Figure 4:
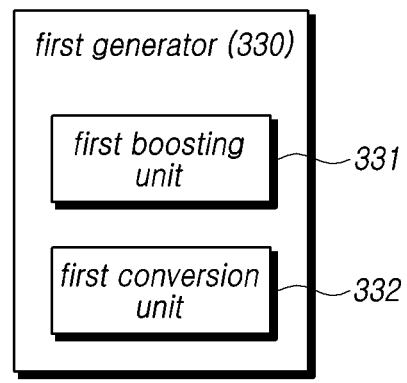
FIG. 4 is a block diagram illustrating a configuration of a first generator according to the present embodiments.

FIG. 4 is a block diagram illustrating a configuration of a first generator according to the present embodiments.

Referring to FIG. 4, the first generator 330 according to the present embodiments may detect a first voltage value generated by the resistance included in the conductor unit 310 and generate a first current sensing value based on the detected first voltage value.

In other words, if current flows through the conductor unit 310, a potential difference (or voltage drop) may be generated between both ends of the conductor unit 310 due to the resistance included in the conductor unit 310. Thus, the first voltage value may be a value representing the potential difference (or voltage drop) generated between both the ends of the conductor unit 310 due to the resistance included in the conductor unit 310.

There may be provided one or more first generator 330. The first generator 330 may include at least one of a first boosting unit 331 and a first conversion unit 332. There may be provided one or more first boosting units 331 and one or more first conversion units 332. The first boosting unit 331 and the first conversion unit 332 may be connected by at least one of an electrical, magnetic, or mechanical connection.

For example, the first generator 330 may include a first boosting unit 331 increasing the detected first voltage value; and a first conversion unit 332 converting the first voltage value increased through the first boosting unit 331 into the first current sensing value.

Here, the first boosting unit 331 may include a first operational amplifier to amplify the detected first voltage value.

Here, the first conversion unit 332 may convert the increased first voltage value into the first current sensing value through a circuit and/or a current conversion algorithm. In particular, the current conversion algorithm and/or the circuit may use Ohm's law.

Figure 5:
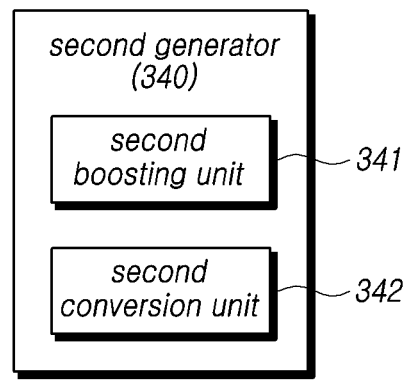
FIG. 5 is a block diagram illustrating a configuration of a second generator according to the present embodiments.

FIG. 5 is a block diagram illustrating a configuration of a second generator according to the present embodiments.

Referring to FIG. 5, the second generator 340 according to the present embodiments may detect a second voltage value generated based on the magnetic field detected through the detector 320 and generate a second current sensing value based on the detected second voltage value.

In other words, if current flows through the conductor unit 310, a magnetic field is generated due to the current flowing through the conductor unit 310, and a potential difference may be generated based on the generated magnetic field. Accordingly, the second voltage value may be a value representing the potential difference generated due to the magnetic field by the current flowing through the conductor unit 310.

There may be provided one or more second generator 340. The second generator 340 may include at least one of a second boosting unit 341 and a second conversion unit 342. There may be provided one or more second boosting units 341 and one or more second conversion units 342. The second boosting unit 341 and the second conversion unit 342 may be connected by at least one of an electrical, magnetic, or mechanical connection.

For example, the second generator 340 may include a second boosting unit 341 increasing the detected second voltage value; and a second conversion unit 342 converting the second voltage value increased through the second boosting unit 341 into the second current sensing value.

Here, the second boosting unit 341 may include a second operational amplifier to amplify the detected second voltage value.

Here, the second conversion unit 342 may convert the increased second voltage value into the second current sensing value through a circuit and/or a current conversion algorithm. In particular, the current conversion algorithm and/or the circuit may use Ohm's law.

Referring to FIGS. 3 to 5, the current sensor 32 according to the present embodiments may further include a verifier 350.

There may be provided one or more verifier 350. The verifier 350 may check whether each of the first current sensing value and the second current sensing value is normal, compare the normal first current sensing value and the normal second current sensing value to verify validity for a normal current sensing value, and output one normal current sensing value of the normal first current sensing value and the normal second current sensing value verified for validity.

Specifically, the verifier 350 may check whether each of the first current sensing value and the second current sensing value is normal.

For example, the verifier 350 may compare each of the first current sensing value and the second current sensing value and its respective preset normal range. As a result of the comparison, if the first current sensing value and the second current sensing value fall within the normal range, the verifier 350 may determine that the first current sensing value and the second current sensing value are normal first current sensing value and normal second current sensing value. As a result of the comparison, unless the first current sensing value and the second current sensing value fall within the normal range, the verifier 350 may determine that the first current sensing value and the second current sensing value are abnormal first current sensing value and abnormal second current sensing value.

The verifier 350 may compare the normal first current sensing value and the normal second current sensing value to verify the validity for the normal current sensing value.

For compare the example, the verifier 350 may difference between the normal first current sensing value and the normal second current sensing value. As a result of the comparison, if the difference between the normal first current sensing value and the normal second current sensing value falls within a preset validity range, the verifier 350 may determine that the normal current sensing value and the normal second current sensing value have validity.

As a result of the comparison, unless the difference between the normal first current sensing value and the normal second current sensing value falls within the preset validity range, the verifier 350 may determine that the normal first current sensing value and the normal second current sensing value don't have validity.

The verifier 350 may output one normal current sensing value of the normal first current sensing value and the normal second current sensing value verified for validity.

Although no duplicate description is given below for simplicity of description, what has been described above may also be applied below. For example, the above-described methods for checking normality, verifying validity, and outputting the normal current value are likewise applicable below.

In an embodiment, the verifier 350 may select one of the first current sensing value and the second current sensing value as a main current sensing value and the other as a redundancy current sensing value, check whether each of the main current sensing value and the redundancy current sensing value is normal, compare the normal main current sensing value and the normal redundancy current sensing value to verify validity for the normal main current sensing value, and output the normal main current sensing value verified for validity.

Meanwhile, if the normal main current sensing value verified for validity is changed to an abnormal value while outputting the normal main current sensing value verified for validity, the verifier 350 may output the normal redundancy current sensing value.

In another embodiment, the verifier 350 may check whether each of the first current sensing value and the second current sensing value is normal, compare the normal first current sensing value and the normal second current sensing value to verify validity for the normal current sensing value, select one of the first current sensing value and second current sensing value verified for validity as a main current sensing value and the other as a redundancy current sensing value, and output the main current sensing value.

Meanwhile, if the main current sensing value is changed to an abnormal value while outputting the main current sensing value, the verifier 350 may output the redundancy current sensing value.

In another embodiment, the verifier 350 may check whether each of the first current sensing value and the second current sensing value is normal, select one of the normal first current sensing value and the normal second current sensing value as a main current sensing value and the other as redundancy current sensing value, compare the main current sensing value and the redundancy current sensing value to verify validity for the main current sensing value, and output the main current sensing value verified for validity.

Meanwhile, if the main current sensing value verified for validity is changed to an abnormal value while outputting the main current sensing value verified for validity, the verifier 350 may output the redundancy current sensing value.

Figure 6:
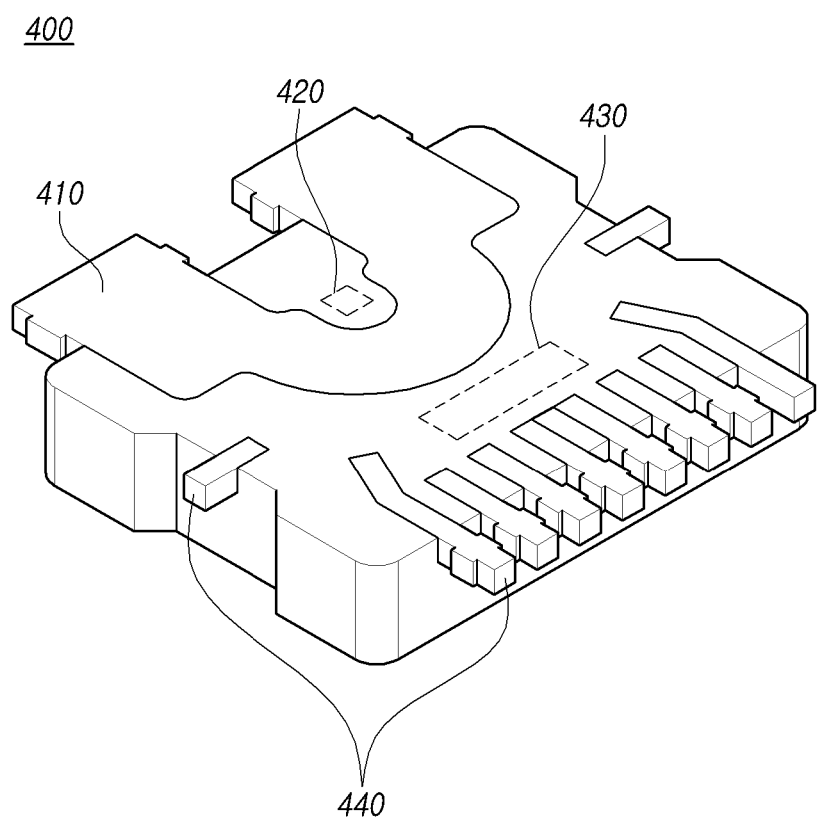
FIGS. 6 to 8 are views illustrating a hall sensor according to the present embodiments.
Figure 7:
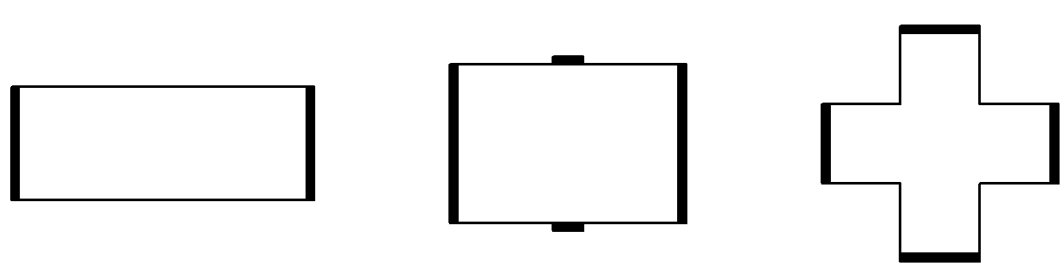
Figure 8:
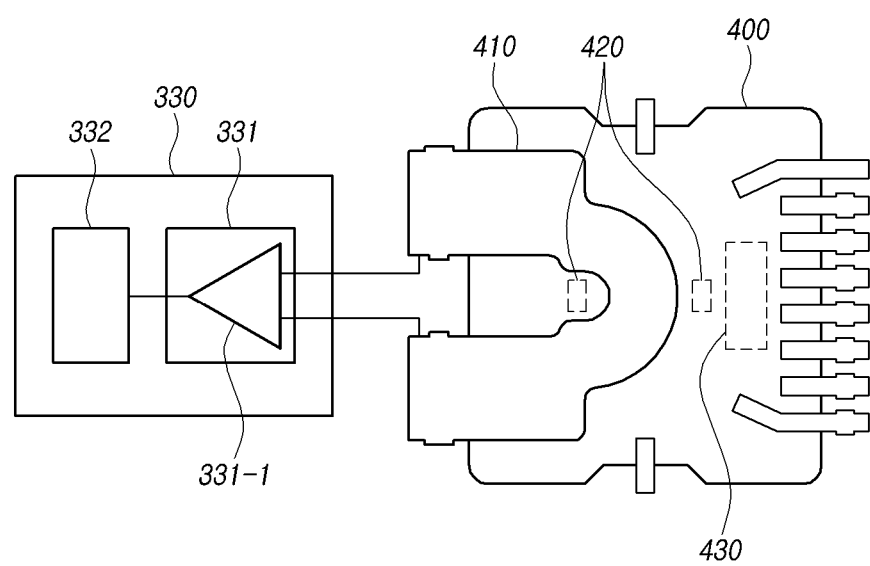

FIGS. 6 to 8 are views illustrating a hall sensor according to the present embodiments.

Referring to FIG. 6, the current sensor 32 according to the present embodiments may include a hall sensor 400 but, without limitations thereto, may include any element that is capable of detecting a magnetic field and generating a voltage (e.g., the second voltage value) based on the magnetic field.

The hall sensor 400 may include a conductor unit 310, a detector 320, and a second generator 340. Here, the conductor unit 310 may be a busbar 410 of the hall sensor, the detector 320 may be a hall element 420 of the hall sensor, and the second generator 340 may be a logic unit 430 of the hall sensor.

There may be provided one or more busbars 410 in the hall sensor. A current may flow through the busbar 410. The busbar 410 of the hall sensor may generate a magnetic field based on the flowing current.

The conductor unit 310 (or the busbar 410 of the hall sensor) may include a low-resistance material. In particular, the low-resistance material may have a resistance value within a preset resistance value. Here, the preset resistance value may be the maximum resistance value that may generate a magnetic field while sensing the current flowing through the conductor unit 310 (or the busbar 410 of the hall sensor).

In particular, the low-resistance material may include a metal material including at least one of gold, silver, copper, iron, and aluminum but, without limitations thereto, may include any material capable of generating the magnetic field while sensing the current flowing through the conductor unit (or the busbar of the hall sensor).

There may be provided one or more hall elements 420 in the hall sensor. The hall element 420 of the hall sensor may detect the magnetic field generated by the current flowing through the busbar 410 of the hall sensor. The hall element 420 of the hall sensor may generate the second voltage value (e.g., a hall voltage value) based on the detected magnetic field.

There may be provided one or more logic units 430 in the hall sensor. The logic unit 430 of the hall sensor may generate the second current sensing value based on the magnetic field detected through the hall element 420 of the hall sensor. In other words, the logic unit 430 of the hall sensor may generate the second current sensing value corresponding to (or proportional to) the current flowing through the busbar 410 of the hall sensor based on the magnetic field detected through the hall element 420 of the hall sensor.

Further, the hall sensor 400 may include a terminal 440. The terminal 440 of the hall sensor may be connected with at least one of the busbar 410, the hall element 420, and the logic unit 430 and may be a power source terminal and a signal terminal connected with a power source line and a signal line.

Referring to FIG. 7, as shown, the hall element 420 of the hall sensor according to the present embodiments may include at least one hall element among an infinite length hall element, a rectangular hall element, and a cross-shaped hall element but, without limitations thereto, may include any shape of hall element capable of detecting a magnetic field and generating a hall voltage based on the magnetic field.

Referring to FIG. 8, the current sensor 32 according to the present embodiments may include a hall sensor 400, and the hall sensor 400 may include a busbar 410, a hall element 420, and a logic unit 430.

Further, the first generator 330 may be connected with both ends of the busbar 410 of the hall sensor.

In other words, the first boosting unit 331 (or first operational amplifier 331-1) may be connected with both ends of the busbar 410 of the hall sensor, and the first boosting unit 331 (or first operational amplifier 331-1) may be connected with the first conversion unit 332.

Specifically, the first boosting unit 331 (or first operational amplifier 331-1) may detect and amplify the first voltage value generated between both ends of the busbar 410 of the hall sensor, and the first conversion unit 332 may convert the amplified first voltage value into the first current sensing value.

As described above, the current sensor according to the present embodiments may detect the second current sensing value based on the magnetic field detected through the hall element of the hall sensor and detect the first current sensing value based on the voltage between both ends of the busbar of the hall sensor.

In other words, the current sensor according to the present embodiments may measure the magnetic field generated as current flows through the hall element of the hall sensor. In this case, the hall sensor may be provided with a busbar through which a current may be conducted to generate a magnetic field. As the current sensor according to the present embodiments, if the resistance included in the busbar provided in the hall sensor is used as a shunt resistor, current may be detected through two current sensing methods (voltage-based current sensing method and magnetic field-based current sensing method) that do not affect each other, without the need for using a separate shunt resistor, and failure in the current sensor and steering system may be detected by comparing the currents sensed by the two sensing methods. In particular, the current sensing method through the current sensor according to the present embodiments may be applicable to both the ground shunt and the phase shunt.

In other words, the current sensor according to the present embodiments has a magnetic field-based current sensing method through a hall sensor and a voltage-based current sensing method using an external operational amplifier included in a busbar built in the hall sensor. The output value of the hall sensor is not affected by a failure due to a variation in the resistance of the busbar of the hall sensor, and the hall sensor is a magnetic field detection scheme and the circuit is without a direct connection. Thus, a failure in the hall sensor 400 does not affect the output through the resistance included in the busbar. Further, the current sensor according to the present embodiments senses and compares currents by two current sensing methods which do not affect each other, thus enhancing the redundancy and reliability for the current sensor and the steering system.

Figure 9:
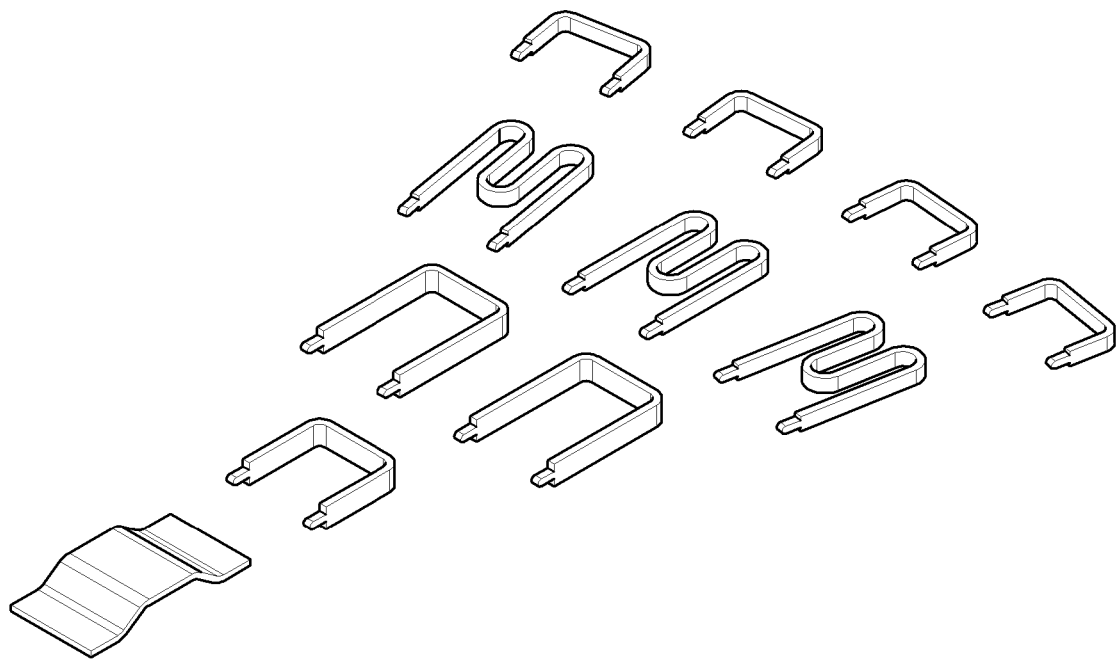
FIG. 9 is a view illustrating a shunt resistor according to the present embodiments.

FIG. 9 is a view illustrating a shunt resistor according to the present embodiments.

Referring to FIG. 9, the conductor unit 310 (busbar 410 of the hall sensor) according to the present embodiments may use a shut resistor. In particular, the form of the shunt resistor shown in the drawings is merely an embodiment, and the shunt resistor may be of any form capable of being used in the conductor unit (busbar of the hall sensor).

Thus, the conductor unit 310 (busbar 410 of the hall sensor) according to the present embodiments may include a shunt resistor including a low-resistance material but, without limitations thereto, may include any resistor capable of generating a magnetic field while sensing the current flowing through the conductor unit (busbar of the hall sensor).

In particular, the low-resistance material may a copper-alloy material but, without limitations thereto, may include any material capable of generating the magnetic field while sensing the current flowing through the conductor unit (or the busbar of the hall sensor). For example, the low-resistance material may include at least one alloy material among a copper-manganese (Cu—Mn) alloy material, a copper-nickel (Cu—Ni) alloy material, an iron-chromium (Fe—Cr) alloy material, and an iron-nickel (Fe—Ni) alloy material, but without limitations thereto, may include any alloy material capable of generating the magnetic field while sensing the current flowing through the conductor unit (or the busbar of the hall sensor).

Referring to FIGS. 1 to 9, the steering control device according to the present embodiments may include at least one of a steering motor power source unit 20, a current sensor 32, and a controller unit 50. Here, the steering control device may be the same component as the above-described steering control module 220.

In the following, content overlapping with FIGS. 1 to 9 will be omitted for brevity of description.

The steering control device according to the present embodiments may include a steering motor power source unit 20 converting electric energy based on a steering motor control signal to generate an assist current and controlling a steering motor 231 based on the assist current; and at least one current sensor 32 detecting the assist current flowing between the steering motor power source unit 20 and the steering motor. The current sensor 32 may include a conductor unit 310 through which assist current flows; a detector 320 detecting a magnetic field generated by the assist current flowing through the conductor unit 310; a first generator 330 generating a first current sensing value based on a resistor included in the conductor unit 310; and a second generator 340 generating a second current sensing value based on the magnetic field detected through the detector 320.

Here, the conductor unit 310, detector 320, first generator 330, and second generator 340 have been described above in connection with FIGS. 1 to 9, and no further description is given below for brevity of description. In particular, the current shown in FIGS. 1 to 9 may be interpreted as having the same meaning as the assist current.

The verifier 350 according to the present embodiments may be included in the current sensor 32 but, without limitations thereto, may be included in the steering control device, and such a case is described below in detail.

The verifier 350 according to the present embodiments may be included in the current sensor 32.

Referring to FIGS. 1 to 9, the verifier 350 may check whether each of the first current sensing value and the second current sensing value is normal, compare the normal first current value and the normal 1 second current sensing value to verify validity for a normal current sensing value, and output one normal current sensing value of the normal first current sensing value and the normal second current sensing value verified for validity.

The controller unit 50 may generate a steering motor control signal based on one normal current sensing value of the normal first current sensing value and the normal second current sensing value verified for validity and a steering motor torque reference value.

In an embodiment, the verifier 350 may select one of the first current sensing value and the second current sensing value as a main current sensing value and the other as a redundancy current sensing value, check whether each of the main current sensing value and the redundancy current sensing value is normal, compare the normal main current sensing value and the normal redundancy current sensing value to verify validity for the normal main current sensing value, and output the normal main current sensing value verified for validity.

The controller unit 50 may generate the steering motor control signal based on the normal main current sensing value verified for validity and the steering motor torque reference value.

Meanwhile, if the normal main current sensing value verified for validity is changed to an abnormal value while outputting the normal main current sensing value verified for validity, the verifier 350 may output the normal redundancy current sensing value, and the controller unit 50 may generate the steering motor control signal based on the normal redundancy current sensing value and the steering motor torque reference value.

In another embodiment, the verifier 350 may check whether each of the first current sensing value and the second current sensing value is normal, compare the normal first current sensing value and the normal second current sensing value to verify validity for the normal current sensing value, select one of the first current sensing value and second current sensing value verified for validity as a main current sensing value and the other as a redundancy current sensing value, and output the main current sensing value.

The controller unit 50 may generate the steering motor control signal based on the main current sensing value and the steering motor torque reference value.

Meanwhile, if the main current sensing value is changed to an abnormal value while outputting the main current sensing value, the verifier 350 may output the redundancy current sensing value, and the controller unit may generate the steering motor control signal based on the redundancy current sensing value and the steering motor torque reference value.

In another embodiment, the verifier 350 may check whether each of the first current sensing value and the second current sensing value is normal, select one of the normal first current sensing value and the normal second current sensing value as a main current sensing value and the other as redundancy current sensing value, compare the main current sensing value and the redundancy current sensing value to verify validity for the main current sensing value, and output the main current sensing value verified for validity.

The controller unit 50 may generate the steering motor control signal based on the main current sensing value verified for validity and the steering motor torque reference value.

Meanwhile, if the main current sensing value verified for validity is changed to an abnormal value while outputting the main current sensing value verified for validity, the verifier 350 may output the redundancy current sensing value, and the controller unit 50 may generate the steering motor control signal based on the redundancy current sensing value and the steering motor torque reference value.

The verifier 350 according to the present embodiments may be included in the steering control device.

Referring to FIGS. 1 to 9, the controller unit 50 may generate a steering motor control signal.

In other words, the controller unit 50 may check whether each of the first current sensing value and the second current sensing value is normal, compare the normal first current sensing value and the normal second current sensing value to verify validity for a normal current sensing value, and generate the steering motor control signal based on one normal current sensing value of the normal first current sensing value and the normal second current sensing value verified for validity and the steering motor torque reference value.

In an embodiment, the controller unit 50 may select one of the first current sensing value and the second current sensing value as a main current sensing value and the other as a redundancy current sensing value, check whether each of the main current sensing value and the redundancy current sensing value is normal, compare the normal main current sensing value and the normal redundancy current sensing value to verify validity for the normal main current sensing value, and generate the steering motor control signal based on the normal main current sensing value verified for validity and the steering motor torque reference value.

Meanwhile, if the normal main current sensing value verified for validity is changed to an abnormal value while generating the steering motor control signal based on the normal main current sensing value verified for validity and the steering motor torque reference value, the controller unit 50 may generate the steering motor control signal based on the normal redundancy current sensing value and the steering motor torque reference value.

In another embodiment, the controller unit 50 may check whether each of the first current sensing value and the second current sensing value is normal, compare the normal first current sensing value and the normal second current sensing value to verify validity for the normal current sensing value, select one of the first current sensing value and second current sensing value verified for validity as a main current sensing value and the other as a redundancy current sensing value, and generate the steering motor control signal based on the main current sensing value and the steering motor torque reference value.

Meanwhile, if the main current sensing value is changed to an abnormal value while generating the steering motor control signal based on the main current sensing value and the steering motor torque reference value, the controller unit 50 may generate the steering motor control signal based on the redundancy current sensing value and the steering motor torque reference value.

In another embodiment, the controller unit 50 may check whether each of the first current sensing value and the second current sensing value is normal, select one of the normal first current sensing value and the normal second current sensing value as a main current sensing value and the other as redundancy current sensing value, compare the main current sensing value and the redundancy current sensing value to verify validity for the main current sensing value, and generate the steering motor control signal based on the main current sensing value verified for validity and the steering motor torque reference value.

Meanwhile, if the main current sensing value verified for validity is changed to an abnormal value while generating the steering motor control signal based on the main current sensing value verified for validity and the steering motor torque reference value, the controller unit 50 may generate the steering motor control signal based on the redundancy current sensing value and the steering motor torque reference value.

Figure 10:
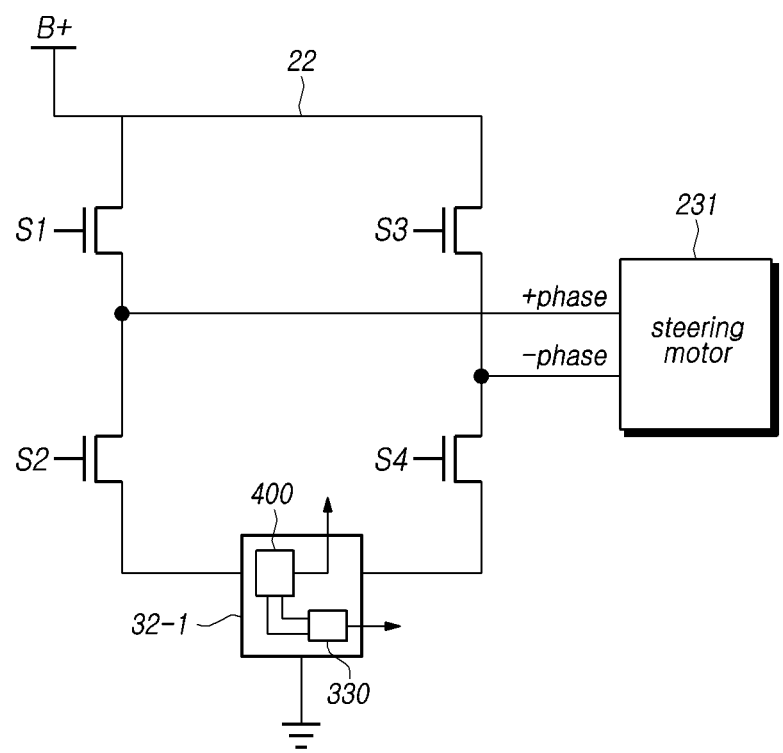
FIGS. 10 and 11 are views illustrating embodiments of applying a current sensor according to the present embodiments.
Figure 11:
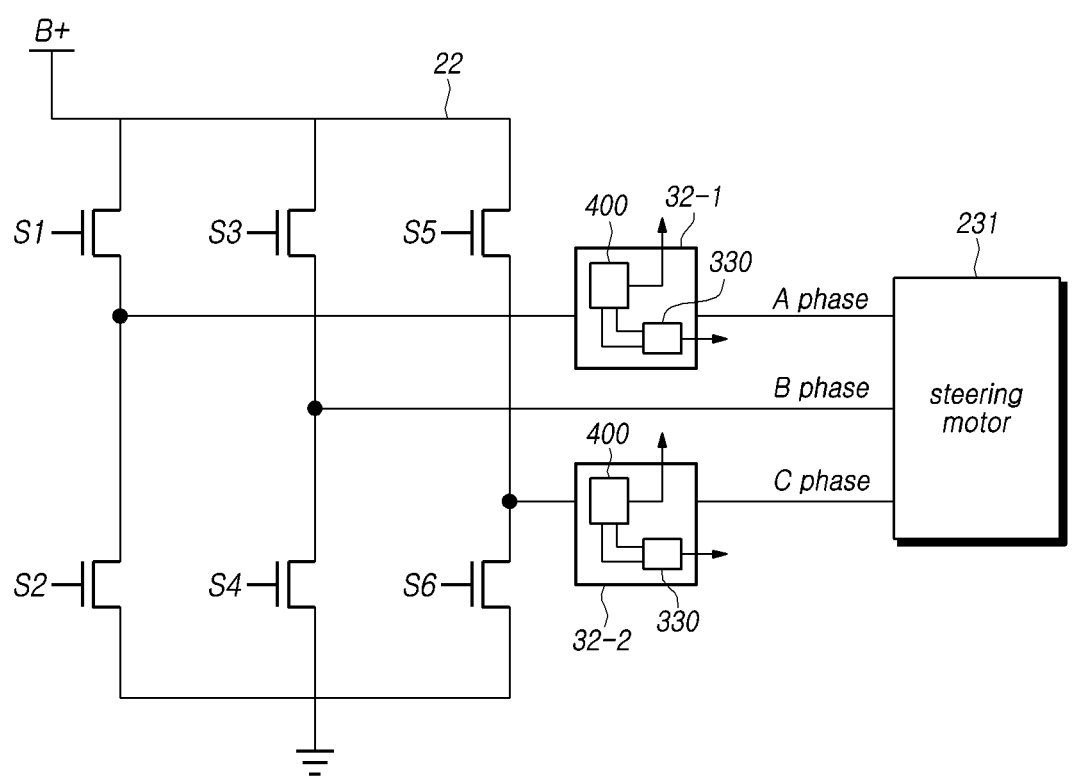

FIGS. 10 and 11 are views illustrating embodiments of applying a current sensor according to the present embodiments.

Referring to FIG. 10, the steering control device according to the present embodiments may include an inverter 22 and a current sensor 32.

The inverter 22 may be a two-phase inverter, that is, an H-bridge type inverter.

The two-phase inverter may be connected between the battery and the steering motor 231. Here, the steering motor may be a DC steering motor.

The two-phase inverter may include an A leg and a B leg. The A leg may include a first switch element S1 and a second switch element S2 connected in series. The B leg may include a third switch element S3 and a fourth switch element S4 connected in series.

The node between the first switch element S1 and the second switch element S2 connected in series and the + phase of the DC steering motor may be connected to each other, and the node between the third switch element S3 and the fourth switch element S4 connected in series and the – phase of the DC steering motor may be connected to each other.

At least one current sensor 32 may be positioned between the two-phase inverter and ground. For example, as shown in the figure, the at least one current sensor 32 may include a first current sensor 32-1, and the first current sensor 32-1 may be positioned between the second switching element S2 of the A leg and the fourth switching element S4 of the B leg and the ground.

Accordingly, the current sensor 32 according to the present embodiments may be positioned between the second switching element S2 of the A leg and the fourth switching element S4 of the B leg and the ground, detecting the second current sensing value based on the magnetic field detected through the hall element of the hall sensor 400 while simultaneously detecting the first current sensing value based on the voltage between both the ends of the busbar of the hall sensor through the first generator 330.

Referring to FIG. 11, the steering control device according to the present embodiments may include an inverter 22 and a current sensor 32.

The inverter 22 may be a three-phase inverter.

The three-phase inverter may be connected between the battery and the steering motor 231. Here, the steering motor 231 may be a three-phase steering motor.

The three-phase inverter may include an A leg, a B leg, and a C leg. The A leg may include a first switch element S1 and a second switch element S2 connected in series. The B leg may include a third switch element S3 and a fourth switch element S4 connected in series. The C leg may include a fifth switch element S5 and a sixth switch element S6 connected in series.

The node between the first switch element S1 and the second switch element S2 connected in series and the A phase of the three-phase steering motor may be connected to each other, the node between the third switch element S3 and the fourth switch element S4 connected in series and the phase B of the three-phase steering motor may be connected to each other, and the node between the fifth switch element S5 and the sixth switch element S6 connected in series and the C phase of the three-phase steering motor may be connected to each other.

At least one current sensor 32 may be positioned between the three-phase inverter and the three-phase steering motor. In other words, the at least one current sensor 32 may be positioned in at least one path among an A path connecting the node between the first switch element S1 and the second switch element S2 connected in series and the A phase of the three-phase steering motor, a B path connecting the node between the third switch element S3 and the fourth switch element S4 connected in series and the phase B of the three-phase steering motor, and a C path connecting the node between the fifth switch element S5 and the sixth switch element S6 connected in series and the C phase of the three-phase steering motor.

For example, as shown in the drawings, the current sensor according to the present embodiments may include a first current sensor 32-1 and a second current sensor 32-1, and the first current sensor 32-1 may be positioned in the A path, and the second current sensor 32-2 may be positioned in the C path.

Accordingly, the current sensor 32 according to the present embodiments may be positioned in the A path and C path, detecting the second current sensing value based on the magnetic field detected through the hall element of the hall sensor 400 while detecting the first current sensing value based on the voltage between both the ends of the busbar of the hall sensor through the first generator 330.

As described above, the conventional current sensor which senses current using a shunt resistor is incapable of detecting a failure in the shunt resistor (i.e., upon shunt resistance drift), and the conventional current sensor which senses current using a hall sensor detects current based on the magnetic field according to current conductance and thus has poor failure detection. In contrast, the current sensor according to the present embodiments adopts dual current sensing using different current sensing methods (voltage-based current sensing method and magnetic field-based current sensing method). Thus, the output values from the current sensing methods do not affect each other, allowing for easy detection of a failure while enhancing redundancy and reliability for the current sensor and steering system.

A current detection method according to the present embodiments is described below with reference to the accompanying drawings. The current detection method according to the present embodiments may be performed through the current sensor, the steering control device, the steering assist device, and the steering system. For simplicity of description, no duplicate description is given below of the current sensor, steering control device, steering assist device, and steering system described above in connection with FIGS. 1 to 11.

Figure 12:
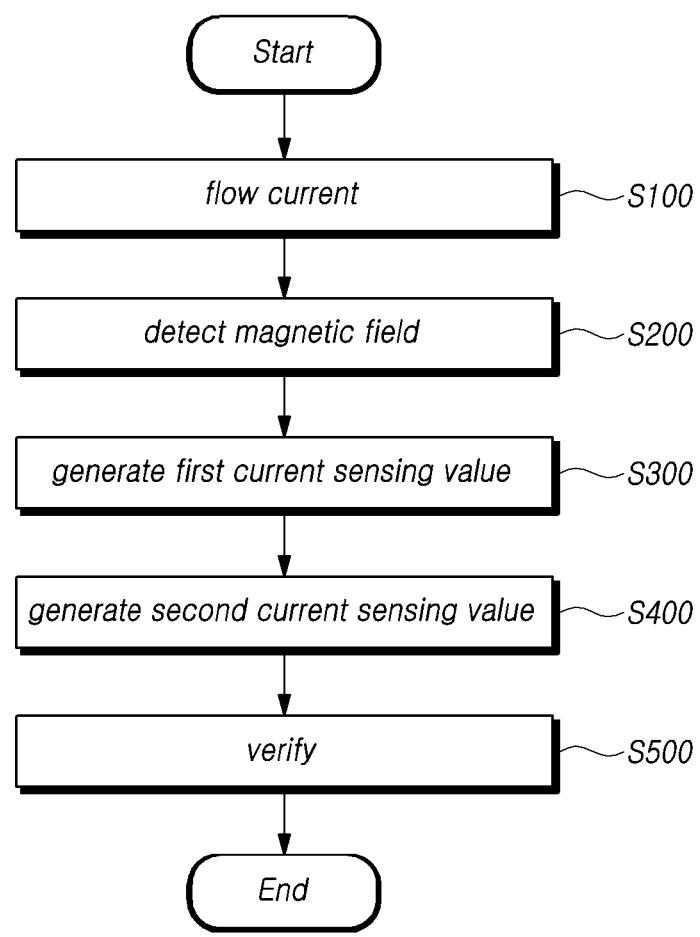
FIG. 12 is a flowchart illustrating a current detection method according to the present embodiments.

FIG. 12 is a flowchart illustrating a current detection method according to the present embodiments.

Referring to FIG. 12, a current detection method according to the present embodiments may include at least one step of flowing current through a conductor unit (S100), detecting a magnetic field (S200), generating a first current sensing value (S300), generating a second current sensing value (S400), and verifying (S500).

For example, the current detection method according to the present embodiments may include flowing current through a conductor unit; detecting a magnetic field generated by the current flowing through the conductor unit; generating a first current sensing value based on a resistor included in the conductor unit; and generating a second current sensing value based on the detected magnetic field.

Specifically, first, a current may be flowed through the conductor unit (S100).

Thereafter, the magnetic field generated by the current flowing through the conductor unit may be detected (S200).

Then, the first current sensing value may be generated based on the resistance included in the conductor unit (S300).

In other words, step S300 may generate the first current sensing value corresponding to the current flowing through the conductor unit based on the resistance included in the conductor unit.

For example, step S300 may detect the first voltage value generated by the resistance included in the conductor unit and generate the first current sensing value based on the detected first voltage value.

Specifically, step S300 may include detecting the first voltage value generated by the resistance included in the conductor unit; increasing the detected first voltage value; and converting the increased first voltage value into the first current sensing value.

Here, increasing the detected first voltage value may amplify the detected first voltage value through a first operational amplifier.

Thereafter, the second current sensing value may be generated based on the detected magnetic field (S400).

In other words, step S400 may generate the second current sensing value corresponding to the current flowing through the conductor unit based on the detected magnetic field.

For example, step S400 may detect the second voltage value generated based on the detected magnetic field and generate the second current sensing value based on the detected second voltage value.

Specifically, step S400 may include detecting the second voltage value generated based on the detected magnetic field; increasing the detected second voltage value; and converting the increased second voltage value into the second current sensing value.

Here, increasing the detected second voltage value may amplify the detected second voltage value through a second operational amplifier.

The current detection method may further include verifying S500 including checking whether each of the first current sensing value and the second current sensing value is normal, comparing the normal first current sensing value and the normal second current sensing value to verify validity for a normal current sensing value, and outputting one normal current sensing value of the normal first current sensing value and the normal second current sensing value verified for validity.

In an embodiment, verifying S500 may select one of the first current sensing value and the second current sensing value as a main current sensing value and the other as a redundancy current sensing value, check whether each of the main current sensing value and the redundancy current sensing value is normal, compare the normal main current sensing value and the normal sensing value to verify validity for the redundancy current normal main current sensing value, and output the normal main current sensing value verified for validity.

Further, if the normal main current sensing value verified for validity is changed to an abnormal value while outputting the normal main current sensing value verified for validity, verifying S500 may output the normal redundancy current sensing value.

In another embodiment, verifying S500 may check whether each of the first current sensing value and the second current sensing value is normal, compare the normal first current sensing value and the normal second current sensing value to verify validity for the normal current sensing value, select one of the first current sensing value and second current sensing value verified for validity as a main current sensing value and the other as a redundancy current sensing value, and output the main current sensing value.

Further, if the main current sensing value is changed to an abnormal value while outputting the main current sensing value, verifying S500 may output the redundancy current sensing value.

In another embodiment, verifying S500 may check whether each of the first current sensing value and the second current sensing value is normal, select one of the normal first current sensing value and the normal second current sensing value as a main current sensing value and the other as redundancy current sensing value, compare the main current sensing value and the redundancy current sensing value to verify validity for the main current sensing value, and output the main current sensing value verified for validity.

Further, if the main current sensing value verified for validity is changed to an abnormal value while outputting the main current sensing value verified for validity, verifying S500 may output the redundancy current sensing value.

Meanwhile, the current detection method according to the present embodiments may include a hall sensor-based current detection method, and the hall sensor-based current detection method may include flowing current through a conductor unit, detecting a magnetic field, and generating a second current sensing value.

Here, flowing the current through the conductor unit may include flowing the current through the busbar of the hall sensor.

Here, detecting the magnetic field may include detecting the magnetic field through the hall element of the hall sensor.

Here, generating the second current sensing value may include generating the second current sensing value through the logic unit of the hall sensor.

As described above, the current detection method according to the present embodiments may include flowing current through a busbar of a hall sensor; detecting a magnetic field generated by the current flowing the busbar of the hall sensor through a hall element; generating a first current sensing value based on a resistance included in the busbar of the hall sensor; and generating a second current sensing value based on the magnetic field detected through a logic unit of the hall sensor.

Figure 13:
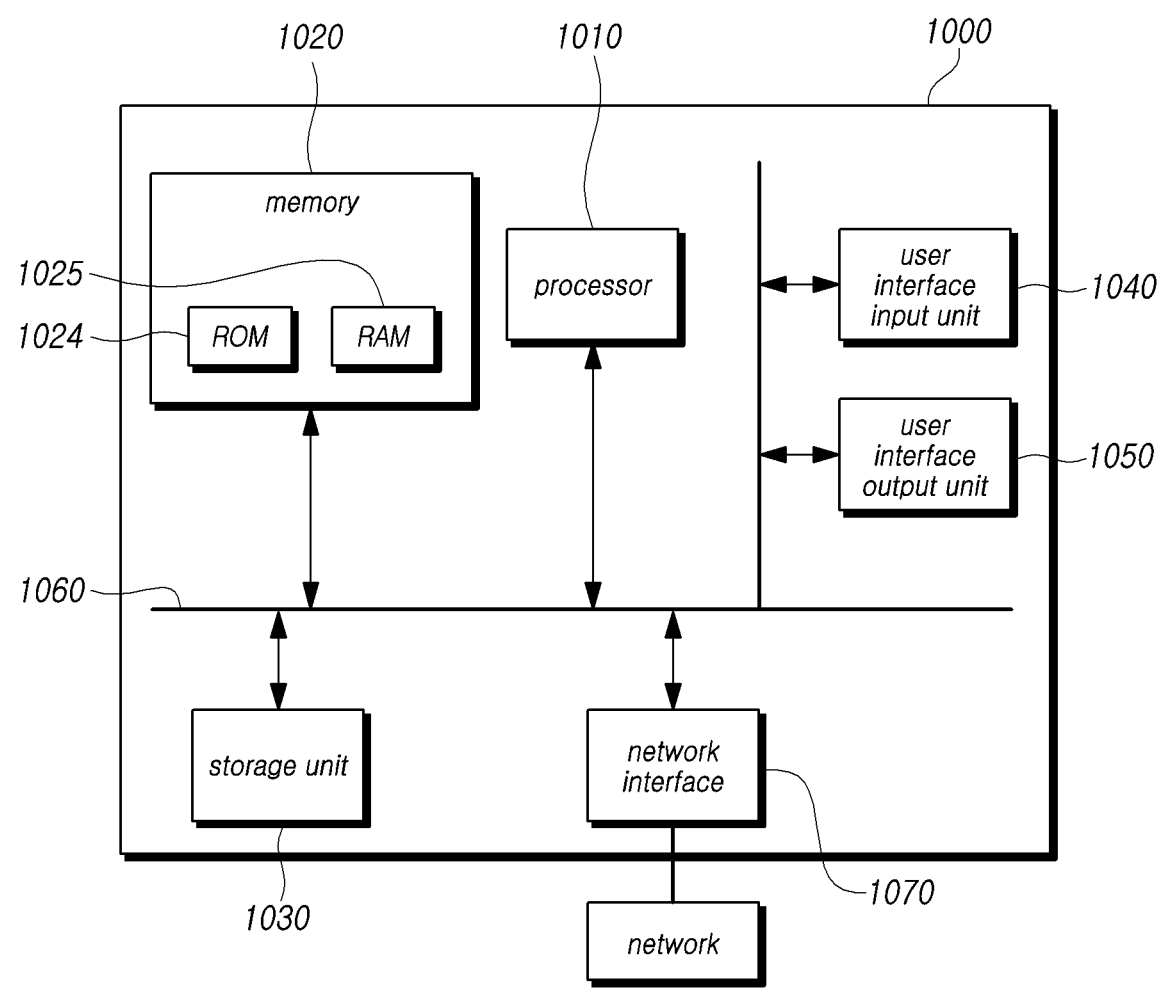
FIG. 13 is a block diagram illustrating a configuration of a current sensor, a steering control device, a steering assist device, and a steering system according to the present embodiments.

FIG. 13 is a block diagram illustrating a configuration of a current sensor, a steering control device, a steering assist device, and a steering system according to the present embodiments.

Referring to FIG. 13, the above-described embodiments may be implemented as, e.g., a computer-readable recording medium, in a computer system. As illustrated in the drawings, the computer system 1000 of the current sensor, the steering control device, steering assist device, and steering system may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1024 and a random access memory (RAM) 1025.

Accordingly, the embodiments may be implemented as a non-volatile computer recording medium storing computer-implemented methods or computer executable instructions. The instructions may be executed by the processor to perform a method according to the present embodiments of the disclosure. In particular, if the at least one core includes a plurality of cores, at least one of the plurality of cores may include a lockstep core.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A current sensor, comprising:
   a hall sensor comprising a conductor busbar generally in a U-shape and a hall element located within and surrounded by the U-shape of the conductor busbar,
   wherein the U-shape of the conductor busbar has a first conductor end and a second conductor end and current flows from the first conductor end to the second conductor end, and
   the hall sensor is configured to detect a magnetic field generated by the current flowing from the first conductor end and to the second conductor end;
   a first generator generating a first current sensing value based on a voltage difference between the first conductor end and the second conductor end of the U-shape of the conductor busbar;
   a second generator generating a second current sensing value based on the magnetic field detected by the hall sensor; and
   a verifier checking whether each of the first current sensing value and the second current sensing value is normal, comparing the normal first current sensing value and the normal second current sensing value to verify validity for a normal current sensing value, and outputting one normal current sensing value of the normal first current sensing value and the normal second current sensing value verified for validity,
   wherein the verifier determines that the normal first current sensing value and the normal second current sensing value have validity if a difference between the normal first current sensing value and the normal second current sensing value falls within a preset validity range,
   wherein the verifier selects one of the normal first current sensing value and normal second current sensing value verified for validity as a normal main current sensing value and the other as a normal redundancy current sensing value, and outputs the normal main current sensing value,
   wherein, when the normal main current sensing value verified for validity is changed to an abnormal value while outputting the normal main current sensing value verified for validity, the verifier outputs the normal redundancy current sensing value.

2. The current sensor of claim 1, wherein the first generator includes,
   a first boosting unit increasing a detected first voltage value; and
   a first conversion unit converting the first voltage value increased through the first boosting unit into the first current sensing value.

3. The current sensor of claim 1, wherein the second generator includes,
   a second boosting unit increasing a detected second voltage value; and
   a second conversion unit converting the second voltage value increased through the second boosting unit into the second current sensing value.

4. The current sensor of claim 1,
   wherein the hall sensor further includes
   a logic unit and the logic unit is the second generator.

5. A steering control device, comprising:
   a steering motor power source unit converting electric energy based on a steering motor control signal to generate an assist current and controlling a steering motor based on the assist current; and
   at least one current sensor detecting the assist current flowing between the steering motor power source unit and the steering motor,
   wherein the current sensor includes,
   a hall sensor comprising a conductor busbar generally in a U-shape and a hall element located within and surrounded by the U-shape of the conductor busbar,
   wherein the U-shape of the conductor busbar has a first conductor end and a second conductor end and current flows from the first conductor end to the second conductor end, and
   the hall sensor is configured to detect a magnetic field generated by the assist current flowing from the first conductor end and to the second conductor end;
   a first generator generating a first current sensing value based on a voltage difference between the first conductor end and the second conductor end of the U-shape of the conductor busbar;
   a second generator generating a second current sensing value based on the magnetic field detected by the hall senor; and
   a verifier checking whether each of the first current sensing value and the second current sensing value is normal, comparing the normal first current sensing value and the normal second current sensing value to verify validity for a normal current sensing value, and outputting one normal current sensing value of the normal first current sensing value and the normal second current sensing value verified for validity,
   wherein the verifier determines that the normal first current sensing value and the normal second current sensing value have validity if a difference between the normal first current sensing value and the normal second current sensing value falls within a preset validity range,
   wherein the verifier selects one of the normal first current sensing value and normal second current sensing value verified for validity as a normal main current sensing value and the other as a normal redundancy current sensing value, and outputs the normal main current sensing value,
   wherein, when the normal main current sensing value verified for validity is changed to an abnormal value while outputting the normal main current sensing value verified for validity, the verifier outputs the normal redundancy current sensing value.

6. The steering control device of claim 5, wherein, if the normal main current sensing value verified for validity is changed to an abnormal value while outputting the normal main current sensing value verified for validity, the verifier outputs the normal redundancy current sensing value.

7. The steering control device of claim 5, further comprising a controller unit generating the steering motor control signal based on one normal current sensing value of the normal first current sensing value and the normal second current sensing value verified for validity and a steering motor torque reference value.

8. A current detection method using a current sensor comprising: a hall sensor comprising a conductor busbar generally in a U-shape and a hall element located within and surrounded by the U-shape of the conductor busbar, the U-shape of the conductor busbar having a first conductor end and a second conductor end, the method comprising:
  flowing current from the first conductor end to the second conductor end;
  detecting, by the hall element, a magnetic field generated by the current flowing from the first conductor end to the second conductor end;
  generating a first current sensing value based on a voltage difference between the first conductor end and the second conductor end of the U-shape of the conductor busbar; and
  generating a second current sensing value based on the magnetic field detected by the hall sensor, and
  checking whether each of the first current sensing value and the second current sensing value is normal, comparing the normal first current sensing value and the normal second current sensing value to verify validity for a normal current sensing value, and outputting one normal current sensing value of the normal first current sensing value and the normal second current sensing value verified for validity, wherein the comparing includes determining that the normal first current sensing value and the normal second current sensing value have validity if a difference between the normal first current sensing value and the normal second current sensing value falls within a preset validity range, wherein the outputting includes selecting one of the normal first current sensing value and normal second current sensing value verified for validity as a normal main current sensing value and the other as a normal redundancy current sensing value, and outputting the normal main current sensing value, wherein, the outputting includes, when the normal main current sensing value verified for validity is changed to an abnormal value while outputting the normal main current sensing value verified for validity, outputting the normal redundancy current sensing value.

* * * * *